United States Patent [19]

Dackus et al.

[11] Patent Number: 4,811,889
[45] Date of Patent: Mar. 14, 1989

[54] METHOD AND APPARATUS FOR THE MANUFACTURE OF POWDER-FILLED STEEL TUBE FROM STEEL STRIP

[75] Inventors: Arnold J. G. Dackus, Arnhem; Cornelis G. J. Brasser, Heemskerk, both of Netherlands

[73] Assignee: Rijnstaal B.V., Arnhem, Netherlands

[21] Appl. No.: 141,257

[22] Filed: Jan. 6, 1988

[30] Foreign Application Priority Data

Jan. 13, 1987 [NL] Netherlands ............... 8700054
Nov. 30, 1987 [NL] Netherlands ............... 8702861

[51] Int. Cl.$^4$ ................. B23K 31/06; B23K 35/40
[52] U.S. Cl. ............................ 228/148; 228/214; 228/221; 228/17.5; 219/145.22; 141/93; 222/108
[58] Field of Search .......... 228/126, 148, 173.4, 228/214, 218, 221, 17.5; 222/108; 141/93, 59; 219/145.22

[56] References Cited

U.S. PATENT DOCUMENTS

| | | |
|---|---|---|
| 2,000,182 | 5/1935 | Lincoln . |
| 3,350,771 | 11/1967 | Durst .................... 228/151 |
| 3,491,721 | 1/1970 | Gill et al. ............... 228/17.5 |
| 3,543,381 | 12/1970 | Martin . |
| 3,623,639 | 11/1971 | McShirley ............... 228/108 |
| 4,061,221 | 12/1977 | Higashinaka et al. ....... 141/93 |
| 4,269,639 | 5/1981 | Lewis .................... 228/148 |
| 4,296,523 | 10/1981 | Clark .................... 141/93 |
| 4,629,110 | 12/1986 | Holmgren et al. ......... 228/148 |
| 4,673,121 | 6/1987 | Holmgren ................ 228/148 |

FOREIGN PATENT DOCUMENTS 158693 10/1985 European Pat. Off. ....... 219/145.22
408810 4/1934 United Kingdom ........... 141/93

OTHER PUBLICATIONS

"Heating and Ventilating's Detail Sheet", Dust Control from Hoppers, pp. 9 and 10, Jul. 1953.

Primary Examiner—Nicholas P. Godici
Assistant Examiner—Samuel M. Heinrich
Attorney, Agent, or Firm—Stevens, Davis, Miller & Mosher

[57] ABSTRACT

In a method for the continuous manufacture of powder-filled steel tube from steel strip, wherein the strip is moved along a path in which successively the moving strip is formed into an open channel, powder is introduced into the open channel, and the channel is shaped into a tube by further deformation and closure of the strip edges together. To avoid the disturbance of the powder by air currents caused by the strip movement and by the closure of the strip, such air currents arising in the vicinity of the moving strip are removed by suction extraction at the location where the powder is introduced into the open channel.

10 Claims, 3 Drawing Sheets

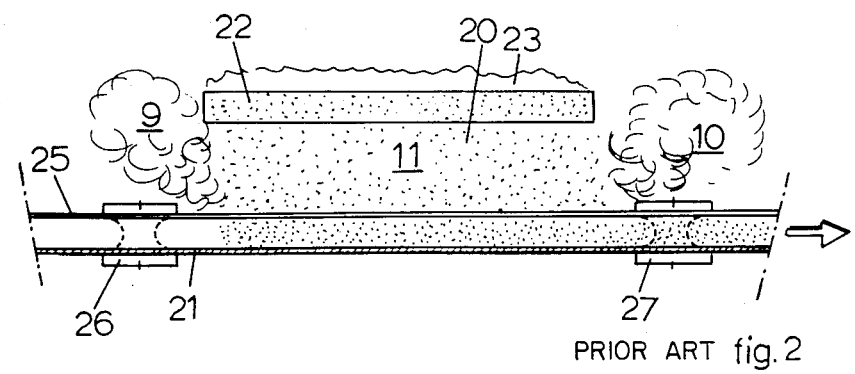
PRIOR ART fig. 2
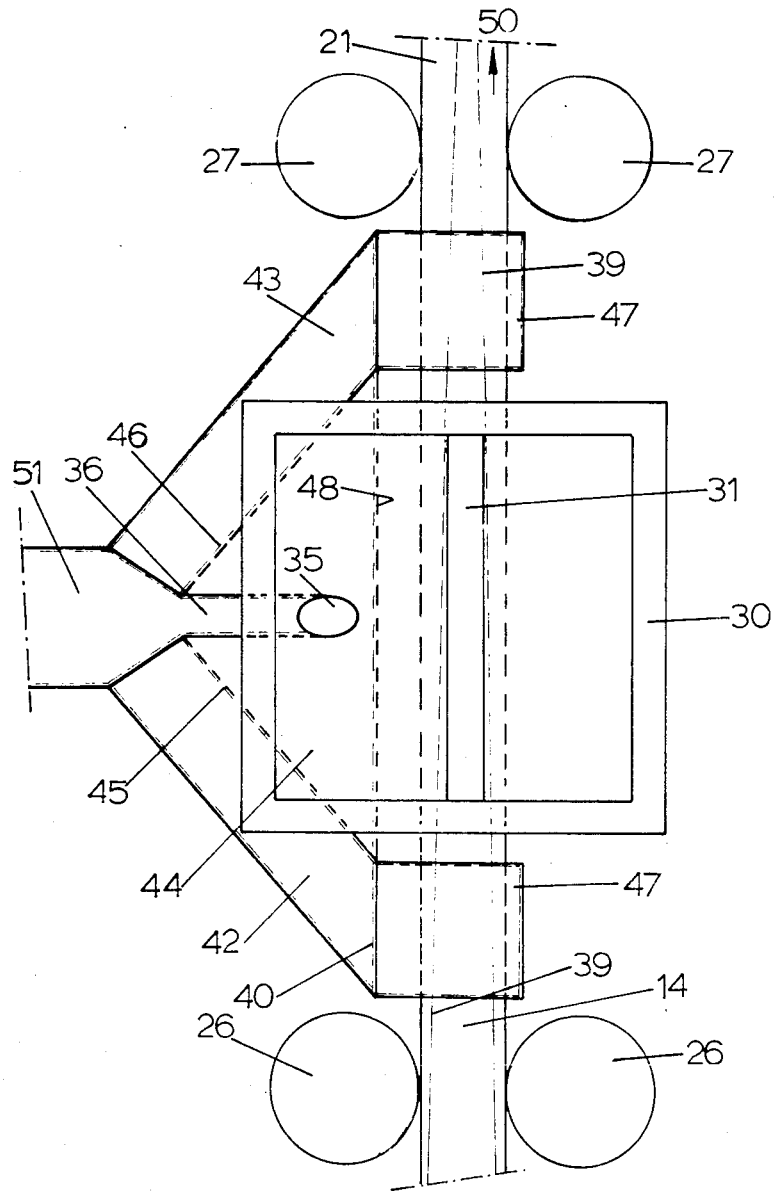
fig. 4

METHOD AND APPARATUS FOR THE MANUFACTURE OF POWDER-FILLED STEEL TUBE FROM STEEL STRIP

BACKGROUND OF THE INVENTION

1. Field of the Invention

This invention relates to a method and apparatus for the manufacture of powder-filled steel tube from steel strip, wherein the strip, while continuously moving along a path, is formed into a channel, is filled with powder and is closed into a tube.

2. Description of the Prior Art

A method of powder-filled tube manufacture as described above is known from EP-A-O No. 158 693. In this, the open channel formed from the steel strip to a feeding station where it is filled with powder. The feeding station is equipped with two powder feeding systems mounted in tandem by means of which a ferromagnetic and a non-ferromagnetic powder are fed successively into the open channel. Subsequently, the open channel is closed by rolling between a set of shaped rolls downstream of the feeding station, and then sealed by welding in a welding station. In this method, on the one hand a cold air current arises over the moving open channel; this air current is generated by the movement of the strip and moves in the same direction, and entrains powder from the channel. On the other hand, there arises a warm air current flowing back from the closed tube; this warm air current results from the reduction in cross-section of the tube and is heated by the welding process and entrains powder from the filled tube.

The powder is poured into the open channel from a significant height, in order to obtain a higher density of the layer of powder in the open channel. By this filling method, known as gravimetric filling, especially the finest powder particles will be brought into a suspended condition, and are then readily entrained and dispersed into the surroundings by the air currents.

Powder particles entrained by air currents and powder particles whirling up cause problems in the manufacture of powder-filled steel tubes. One of the problems is that powder particles which have been temporarily entrained and powder particles which have whirled up deposit on the open channel, settling on those parts of the edge of the steel strip which are joined together when the tube is formed, the so-called strip edges, thereby affecting adversely the quality of the joint made subsequently. In EP-A-O 158 693 it is suggested to solve this problem of fouled strip edges by providing an air exhaust arrangement between the feeding station and the welding or folding station, for removal of the cold and warm air flows. The mouths of this exhaust arrangement are positioned over the open channel.

SUMMARY OF THE INVENTION

The object of the present invention is to further reduce the adverse effects of powder particles entrained by air currents and of powder particles whirling up in the manufacture of powder-filled steel tube.

The invention is based on a new insight, namely that when the powder is fed gravimetrically into the open channel, it is necessary to leave the powder alone as far as possible, and not to disturb it by introducing air currents passing over it.

To this end the method according to the invention is characterized in that air currents are removed by suction extraction where the powdered material is introduced into the open channel.

The great advantage thus achieved is that the cold air current generated by the moving open channel is extracted before the powder feeding station is reached, or as it is reached, which is of vital importance, notably at high strip velocities.

Another advantage of the method according to the invention is that it also solves the problem of powder dust dispersing into the surroundings. The powder dust generated and whirling up in the course of gravimetric filling is now extracted at source, before it can spread into the surroundings.

Especially advantageously, at the upstream end of the location where the powder is introduced into the open channel, in the longitudinal direction of movement of the strip, air is extracted from around the strip at a higher velocity than at a downstream neighbouring region of said location. Similarly, it is especially advantageous if, at the downstream end of the location where the powder is introduced, in the longitudinal direction of movement of the strip, air is extracted from the strip at a higher velocity than at an upstream neighbouring region of said location. Thus there may be three extraction regions, two of higher velocity at the ends of the powder filling location and one of lower velocity in between.

In this way, it is achieved that the cold air current generated by the moving open channel the warm air current generated by welding and by reduction in cross section of the closed tube respectively, for practical purposes, can be fully extracted without introducing large air currents in the central area of the location where the powder is introduced into the channel.

Preferably, the air currents are extracted in a substantially horizontal direction. This yields the advantage that powder dust particles need not be drawn off against the force of gravity and that, consequently, it is possible to use lower air velocities for air currents extracted.

The invention also consists in apparatus for carrying out the above method having means for shaping the moving strip into an open channel, a filling station having means for filling the powder into the open channel and means for deforming the channel into the tube and joining the strip edges together. This apparatus is characterized in that at said filling station there are provided suction extraction means to remove air currents around the moving strip at the filling station.

Preferably the filling means comprises at least one feed hopper having a lower end which has slot-shaped opening extending longitudinally in the direction of movement of the strip and which, in use, projects into the open channel to deliver powder therein, and the extraction means has at least one elongate extraction mouth having its elongate direction substantially parallel to the elongate direction of said slot-shaped opening of the hopper and being directed towards said slot-shaped opening.

In a filling station thus arranged the powder falling off a feeding conveyor is enclosed by the feed hopper and led into the open channel. Powder escaping from the open channel is largely extracted via the opening of the extraction mouth, and removed.

Preferably, the said extraction mouth has, arranged in the direction of movement of the strip, three portions forming respectively upstream, middle and downstream intake openings which are connected to respective extraction passages which are in turn connected to a common extraction duct, the upstream and downstream intake openings being each of a smaller area than the intermediate intake opening, so that the air flow velocity is greater through said upstream intake openings than through said intermediate opening. In this embodiment, the velocity at which the air currents are drawn off is higher at the outer ends of the extraction mouth than in the area located in between. The cold air currents generated by the moving tube and the warm air currents generated by the reduction in crosssection of the tube and by the welding operation can be extracted to a very great extent.

It is preferred that the extraction mouth is directed substantially horizontally towards said slot-shaped opening of the hopper. In principle, extraction can take place in any direction. It has been found, however, that as a result of moisture in the powder or in the extracted air, powder deposits can build up on the walls of the extraction mouth. The moisture in the air, for example, originates from lubricants used in deforming the steel strip. With horizontal extraction, in the case of gravimetric filling of the channel, the air currents are removed in horizontal direction through the horizontally oriented opening of the extraction mouth. Thus powder deposits becoming detached from the wall of the extraction mouth cannot fall into the open channel or onto the strip edges.

In gravimetric filling of the open channel with powder, the powder is poured into the feed hopper by a feeding device, which feed hopper encloses the powder and guides it into the open channel. The air current generated in the feed hopper by the falling powder causes the finer powder particles to whirl up. If no measures are taken, the powder whirling up can leave the feed hopper at the inlet side and disperse into the surroundings. Preferably, therefore, the hopper is provided with air extraction means, e.g. a duct leading to a main extraction duct. The powder dust whirling up in the hopper is removed effectively from the hopper and does not disperse into the surroundings.

Preferably also, the feed hopper, at least at its said lower end, is elongate with its elongate direction substantially parallel to said elongate extraction mouth. This makes it possible for the opening of the extraction mouth to be positioned close to the path of the open channel so that the air slot along which the air current must be extracted can be kept small.

In an alternative form, the filling means comprises at least one hopper having a lower end which has a slot-shaped delivery opening extending longitudinally in the direction of movement of the strip, and the suction extraction means comprises a casing mounted alongside the feed hopper and open adjacent the said lower end of the feed hopper, the interior of said casing being connected to an exhaust duct. This provides a simple and easily installed air extraction system.

As has been described above, a powder-filled steel tube is made by starting from steel strip and deforming this strip in a number of steps with the aid of shaped rolls; first into an open channel and subsequently in further steps into a closed tube. The strip used as initial material carries a thin film of an oily lubricating and preserving agent. As a result of this film, the open channel is greasy both internally and externally when being filled with powder. It has been found that once whirled up powder particles have adhered to the greasy surface of the open channel, the extraction mouth cannot detach and remove the deposited powder particles. However, powder particles that have adhered to the strip edges can cause a poor joint between the strip edges, and powder particles on the external wall of the open channel can damage the shaped rolls for the subsequent deforming phases. The prevention of the adverse effects of powder particles entrained by air curents and powder particles whirling up is improved if the apparatus of the invention has at said filling station shield means arranged to hinder fouling by the powder of the edges of the steel strip and of the external surface of the open channel.

Suitably the shield means comprises a shielding channel which encloses said external surface of the open channel at least at the location where the powder is introduced into the channel, the shielding channel being provided with flexible scraper elements which contact at least a part of the edges of the moving steel strip. The flexible scraper elements scrape along the strip edges and remove any adhering powder particles, whilst in addition, together with the shielding channel, they protect the external wall of the open channel from powder particles being deposited on it.

It is preferred in the invention that the suction extraction means includes means for separating powder particles from the extracted air. The powder particles, if discharged to the atmosphere, constitute pollution, and they also have economic value. By separating the powder extracted with the air, the powder can be recovered and re-used.

BRIEF INTRODUCTION OF THE DRAWINGS

With reference to the accompanying drawings, embodiments of the invention will be described below by way of non-limitative example. In the drawings:

FIG. 1 shows a series of perspective views to illustrate the steps involved in the forming of powder filled tube products, FIG. 2 shows a longitudinal sectional view of a conventional powder feeding station, FIG. 3 shows a cross sectional view through a powder feeding station with extraction mouth and shielding channel embodying the invention, FIG. 4 shows a top view of part of the apparatus shown in FIG. 3, and FIG. 5 is a part cross-sectional view of the feeding station of another embodiment of the invention.

DESCRIPTION OF THE PREFERRED EMBODIMENT

In the illustrated embodiments of the invention, the tubular product formed is ladle wire, while the filling material is a metallurgical powder intended for a molten steel bath. However, the invention is not limited to this application, but may equally be employed in the manufacture of powder-filled welding rods.

All elements not directly related to the inventive concept have been omitted from the drawings. Features not illustrated are known in the prior art and/or will be apparent to an expert.

In a method for the continuous manufacture of powder-filled steel tube of any length, the point of departure is a coil of strip steel of a suitable width, fitted rotatably in an uncoiling station, from which a strip is uncoiled.

If desired, the strip can be fed to a looping accumulator. There a butt welding unit may be installed to join the end of each uncoiled coil to the beginning of the next coil of steel strip. The looping accumulator serves to supply the tubeforming machine with strip material during the butt welding operation.

Figure 1:
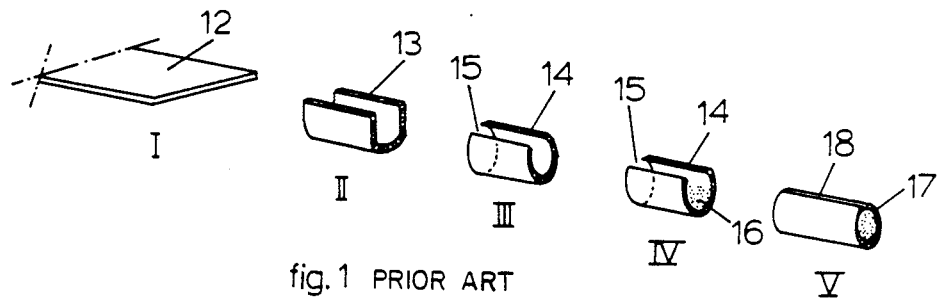

As FIG. 1 shows, in a series of successive steps I to V in a tube-forming machine (not shown), the initially flat strip 12 (step I) is successively formed into a generally U-shaped channel 13 (step II), and an open channel 14 whose sides curve upward, thus forming a partial tube with a slot 15 extending in longitudinal direction at the top (step III).

The open channel 14 next passes through a filling station, in which powder 16 is introduced into the channel via the slot 15 (step IV). After filling, the channel is shaped into a tube 17 enclosing the powder 16 by further deformation and by welding or folding the strip edges together (step V). The seam in the tube is indicated by 18. Subsequently, the tube 17 can be reduced to smaller diameters, which operation is not shown in FIG. 1.

FIG. 2 shows a powder filling station of a conventional design in longitudinal section. In this station, powdered filling material 23 is introduced gravimetrically into the rounded channel-shaped strip 21.

The filling station comprises an elongated feeding conveyor belt 22 extending in the longitudinal direction of the strip 21, which belt applies the powdered filling material 23 at a chosen rate, and pours it into the open channel. Down-falling powder 20 and powder dust whirling up are carried off by air currents and form dust clouds 9,10 and 11, which disperse freely. The air currents are generated mainly by the movement of the strip, by the reduction in cross section of the tube and heating of the air as a result of the welding operation, and by the down-falling powder. The two first-mentioned air currents produce the large dust clouds 9 and 10 particularly at the two ends of the feeding station.

The dust clouds hide the filling of the open channel and the joining of the strip edges from the view of the operating personnel, and spread into the workroom, where the dust may be inhaled. Especially the magnetizable components in the dust clouds settle on the steel rolls 26 and 27, on the external wall of the strip 21 and on the strip edges 25. During the subsequent welding together of the strip edges, this powder on the strip edges is experienced as detrimental to obtaining a good quality weld. During the closing by rolling of the rounded, channel-shaped strip 21 during the reduction of the cross section, powder dust that has deposited on the steel rolls and on the external wall of the strip causes damage to the steel rolls and to this external wall.

Figure 3:
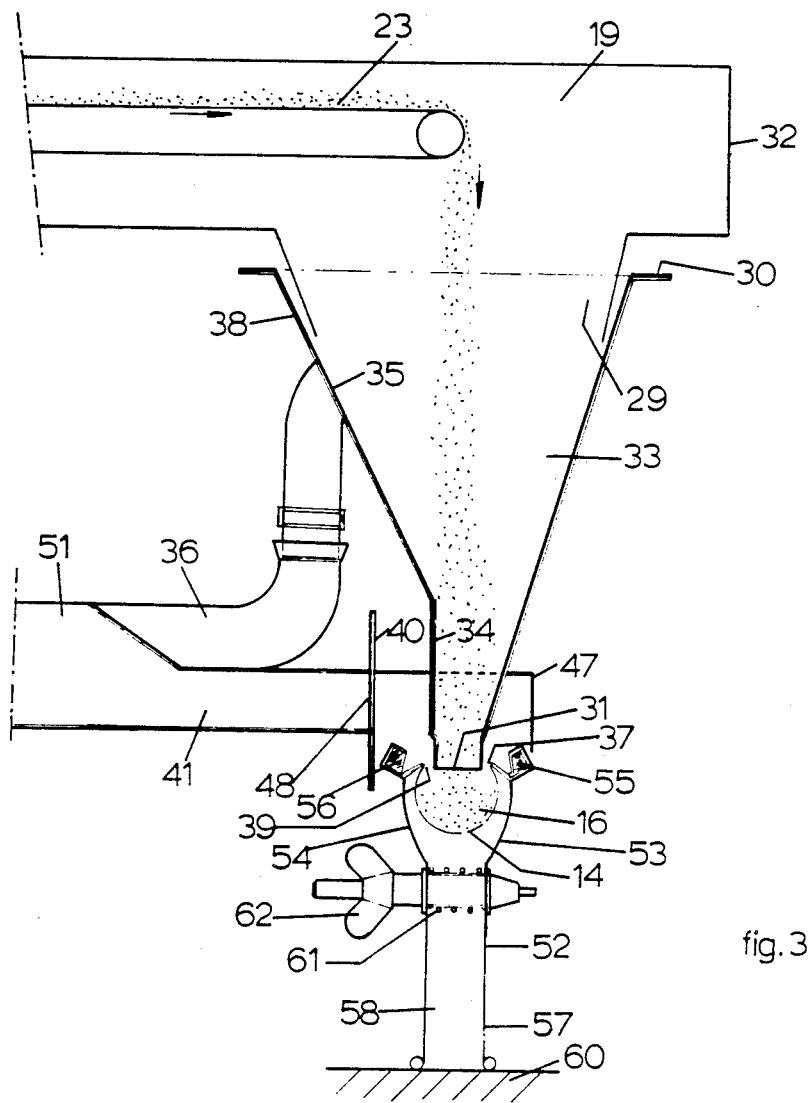

These drawbacks no longer occur in the method and apparatus according to the invention. FIG. 3 and FIG. 4 show an elongated hopper 30 attached to the frame (not shown) of the tube-forming machine. Two opposing walls of this hopper converge downwards to a narrow slot-shaped opening 31, which is located in the forward moving open channel 14, as is best shown in FIG. 3. Powdered filling material 23 is poured from a differential weighing unit 19 into the hopper 30, falling freely into the forward moving round channel 14 (gravimetric filling) and forming in this channel a layer of powder 16. The differential weighing unit 19 has a housing 32 equipped at the bottom with a discharge opening 29 extending into the hopper 30.

As a matter of course, the free-falling powder entrains a certain amount of air and, if the hopper 30 were not present, this air alone would cause the floating, finest dust particles from the powder to whirl up and disperse into the surroundings. The presence of hopper 30 is sufficient to prevent this to a considerable extent.

Powder dust whirling up and returning into the hopper, and powder dust produced by air currents in the hopper are removed from the hopper via the suction exhaust opening 35 and the exhaust channel 36. The exhaust channel 36 discharges into a suction collecting duct 51, which is connected to a device providing suction facility (with dust separator) not shown in the figure. The dust exhaustion in the hopper 30 causes an underpressure in the slot 37 between the bottom end of the hopper and the strip edges, which underpressure helps to counteract dispersion of the powder via the slot 37.

Next to the bottom end of the hopper 30 and parallel to it, a suction extraction mouth 40 extending in the longitudinal direction of the hopper is located. On the side directed to the extraction mouth, the hopper is provided with a section that runs parallel to the opening 48 of the extraction mouth. The opening 48 of the extraction mouth is divided into three parts by means of two partition walls 45 and 46. The partition walls 45 and 46 form three extraction passages 42,43 and 44 in the extraction mouth. The extraction passages 42,43 and 44 converge into a suction removal duct 41 which, together with the suction exhaust channel 36 discharges into the collecting duct 51. The extraction passages 42,43 and 44 run horizontally, so that deposits that may build up in the channels from the powder dust cannot fall on the strip edges 39. By suitable positioning of the partition walls 45 and 46, the intake openings of the upstream and downstream extraction passages 42 and 43 are made smaller than the intake opening of the middle or intermediate passage 44. As all three passages 42,43,44 come together in a common removal duct 41, the air velocities in the extraction passages 42 and 43 are higher than the air velocity in the middle extraction passage 44. The air current displaced along with the open channel 14 moving rapidly in the direction of the arrow 50, is prevented from coming into contact with the powder by extraction into the upstream extraction passage 42. The air emerging from the closed tube is drawn to the downstream extraction passage 43 of the extraction system. Any residues of these air currents, and air currents produced by the falling powder, are extracted by extraction passage 44. Due to this air removal, powder particles which otherwise might settle on the strip edges 39 of the still open channel, are extracted in good time, so that good conditions are created to welding the two strip edges of the open channel together. To guide the air currents to the intake openings of the extraction passages 42 and 43, hoods 47 can be provided.

To prevent escaped powder particles from settling afterwards on the strip edges or on the external wall of the open channel, a shielding channel 52 is placed around the still open channel. For the sake of greater clarity, the shielding channel is only shown in FIG. 3. The shielding channel comprises two curved shields 53 and 54 which have a bending radius of a few times the radius of the open channel and which are manufactured from a non-magnetic material or a plastics material, such as polyvinylchloride. By means of the walls 57 and 58, the lower edges of the shields 53 and 54 are hinge-connected to the frame 60 (not shown), of the tube-forming machine. On the inner side 55 of the upper edge, each shield is fitted with a V-shaped sealing strip 56 made of a synthetic rubber. By means of a spring 61 and a bolt 62, the two sealing strips are pressed with an adjustable force on the two strip edges of the forward moving channel.

The sealing strips 56 scrape off any powder already present on the strip edges when they enter the filling station, and, in the filling station, prevent powder from adhering to the strip edges, which are generally wet on account of lubricant, or to the external wall of the channel. When the sealing strips become fouled or worn, they can be renewed rapidly, easily and at little expense at a suitable time, for example during an interruption of the production run.

Figure 5:
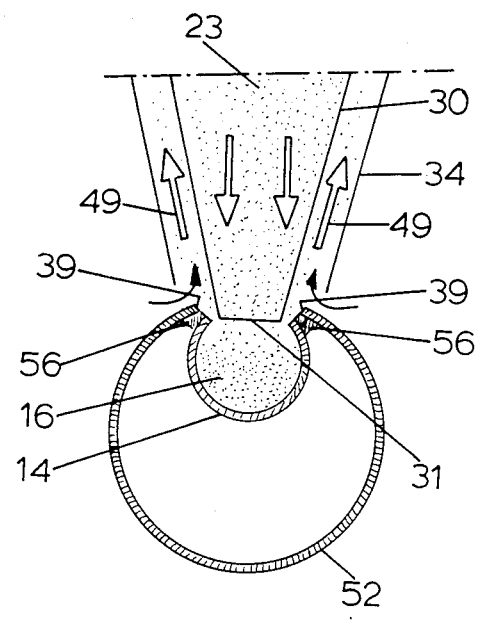

FIG. 5 shows schematically another embodiment of the invention. Powdered filling material 23 is poured into the feed hopper 30 that extends downwardly to a slot-shaped opening located at the mouth of the open channel 14 of the moving strip. The powder forms a layer 16 of powder on the bottom of the open channel. Around the open channel 14 is a shielding channel 52 made from a cut-open plastic tube. The insides of the edges of the shielding channel are provided with strips 56 that scrape over part of the strip edges 39. For this purpose, a self-adhesive foam rubber strip is found to be very suitable. Around the feed hopper 30 a casing 34 is fitted which has in general the same shape as the feed hopper 30. The casing 34 is provided with means for connecting it to a, not shown, suction exhaust device.

The examples given are based on the use of a single hopper into which powder of one kind is fed. To the person skilled in the art it is clear that the invention can also be applied using several hoppers, or using a hopper divided into several compartments by partition walls, for feeding several kinds of powder into the channel. In this latter case, it is usually sufficient to apply an extraction mouth of the described embodiment for the entire filling station.

By the method disclosed and the apparatus described, it is possible to obtain a welded seam of a very good quality at very high welding speeds.

The exhaust system of the construction described prevents the air currents mentioned before from causing the powder to whirl up and from bringing it into contact with the strip edges and the external wall of the open channel.

What is claimed is:

1. Method for the continuous manufacture of powder-filled steel tube from steel strip, comprising moving the strip along a path and in said path performing the steps of (a) forming the moving strip into an open channel (b) introducing powder into said open channel, (c) shaping said open channel after introduction of the powder into a tube by further deformation and closure of the strip edges together, and (d) removing air currents arising in the vicinity of the moving strip by suction extraction at the location where the powder is introduced into the open channel, said step of removing air currents including an upstream end of said location where the powder is introduced into the open channel, in the longitudinal direction of movement of the strip and air is extracted from around the strip at a higher velocity than at a downstream neighboring region of said location.

2. Method for the continuous manufacture of powder-filled steel tube from steel strip, comprising moving the strip along a path and in said path performing the steps of (a) forming the moving strip into an open channel, (b) introducing powder into sad open channel, (c) shaping said open channel after introduction of the powder into a tube by further deformation and closure of the strip edges together, and (d) removing air currents arising in the vicinity of the moving strip by suction extraction at the location where the powder is introduced into the open channel, said step of removing air current including a downstream end of said location where the powder is introduced, in the longitudinal direction of movement of the strip and air is extracted from the strip at a higher velocity than at an upstream neighboring region of said location.

3. Apparatus for the continuous manufacture of powder-filled steel tube from steel strip by moving the strip along a path while performing operations on it, said apparatus comprising (a) means for shaping the moving strip into an open channel, (b) a filling station having means for filling powder into said open channel, (c) means for deforming said open channel after filling of the powder into it, into a tube and joining the strip edges together, and (d) at said filling station suction extraction means to remove air currents around the moving strip at the filling station, said filling means comprising at least one feed hopper having a lower end which has slot-shaped opening extending longitudinally in the direction of movement of the strip and which, in use, projects into said open channel to deliver powder therein, and said suction extraction means having at least one elongate extraction mouth having its elongate direction substantially parallel to the elongate direction of said slot-shaped opening of the hopper and being directed towards said slot-shaped opening.

4. Apparatus according to claim 3 wherein said extraction mouth has, arranged in the direction of movement of the strip, three portions forming respectively upstream, middle and downstream intake openings and there are provided three extraction passages to which said intake openings are respectively connected and a common extraction duct to which said three extraction passages are connected, the upstream and downstream intake openings being each of a smaller area than the intermediate intake opening, so that the air flow velocity is greater through said upstream intake openings than through said intermediate opening.

5. Apparatus according to claim 3 wherein said extraction mouth is directed substantially horizontally towards said slot-shaped opening of the hopper.

6. Apparatus according to claim 3 wherein said suction extraction means include means for extracting air from said hopper.

7. Apparatus according to claim 3 wherein the feed hopper, at least at its said bottom end, is elongate with its elongate direction substantially parallel to said elongate extraction mouth.

8. Apparatus according to claim 3 wherein said suction extraction means comprises a casing and an exhaust duct, said casing defining said elongate extraction mouth and having an interior connected to said exhaust duct.

9. Apparatus for the continuous manufacture of powder-filled steel tube from steel strip by moving the strip along a path while performing operations on it, said apparatus comprising (a) means for shaping the moving strip into an open channel, (b) a filling station having means for filling powder into said open channel, (c) means for deforming said open channel after filling of the powder into it, into a tube and joining the strip edges together, and (d) at said filling station suction extraction means to remove air currents around the moving strip at the filling station, said filling station having a shield means arranged to hinder fouling by the powder of the edges of the steel strip and of the external surface of the open channel, said shield means comprising a shielding channel which encloses said external surface of the open channel at least at the location where the powder is introduced into the channel, the shielding channel being provided with flexible scraper elements which contact at least a part of the edges of the moving steel strip.

10. Apparatus according to claim 9 wherein the suction extraction means includes means for separating powder particles from the extracted air.

* * * * *